United States Patent [19]

Johnson

[11] Patent Number: 5,071,290

[45] Date of Patent: Dec. 10, 1991

[54] TANK TRUCK MANHOLE FILTER

[75] Inventor: Ronald D. Johnson, Leawood, Kans.

[73] Assignee: United States Systems, Inc., Kansas City, Kans.

[21] Appl. No.: 428,244

[22] Filed: Oct. 27, 1989

[51] Int. Cl.⁵ .................. B65G 53/60; B65G 53/10; B60P 1/60
[52] U.S. Cl. .................................. 406/171; 406/39; 406/41; 406/145; 406/175
[58] Field of Search .............. 406/145, 146, 39–41, 406/171, 175, 139, 151, 172, 173

[56] References Cited

U.S. PATENT DOCUMENTS

| 589,106 | 8/1897 | Weber | 406/39 |
|---|---|---|---|
| 1,707,206 | 3/1929 | Bernert | 406/175 |
| 3,147,041 | 9/1964 | Howcroft | 406/175 X |
| 4,659,262 | 4/1987 | van Aalst | 406/41 X |
| 4,695,205 | 9/1987 | Levine | 406/171 X |
| 4,718,796 | 1/1988 | Shiers et al. | 406/41 X |
| 4,844,665 | 7/1989 | Howell | 406/173 |
| 4,904,126 | 2/1990 | Voith | 406/171 X |
| 4,917,544 | 4/1990 | Crahan et al. | 406/146 X |

FOREIGN PATENT DOCUMENTS

| 384365 | 10/1939 | Canada | 406/39 |
|---|---|---|---|
| 1045210 | 11/1953 | France | 406/39 |
| 2613705 | 10/1988 | France | 406/41 |
| 635819 | 3/1962 | Italy | 406/39 |
| 321361 | 4/1957 | Switzerland | 406/39 |
| 654518 | 3/1979 | U.S.S.R. | 406/171 |

Primary Examiner—Dennis H. Pedder
Assistant Examiner—James M. Kannofsky
Attorney, Agent, or Firm—Hovey, Williams, Timmons & Collins

[57] ABSTRACT

A filter apparatus for use in filtering dust and the like from a pressurized air stream flowing through a manhole of a hopper trailer in a particulate transfer system includes a filter sheet having a shape substantially corresponding to the shape of the manhole and a plurality of filters mounted thereon. A retainer flange is installed in the manhole for supporting the filter sheet and a filter hold down is provided for holding the filter assembly in the manhole and for pressing the filter sheet into contact with the retainer flange. The filter hold down clamp contacts the filter sheet along the central longitudinal axis of the passage in order to provide one-point hold down of the sheet.

15 Claims, 4 Drawing Sheets

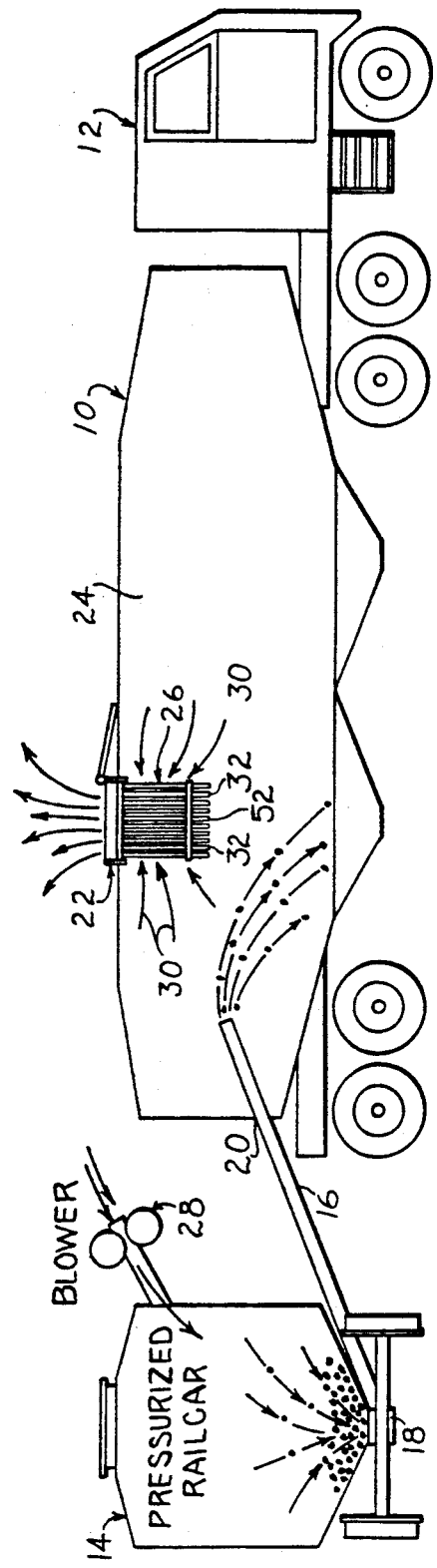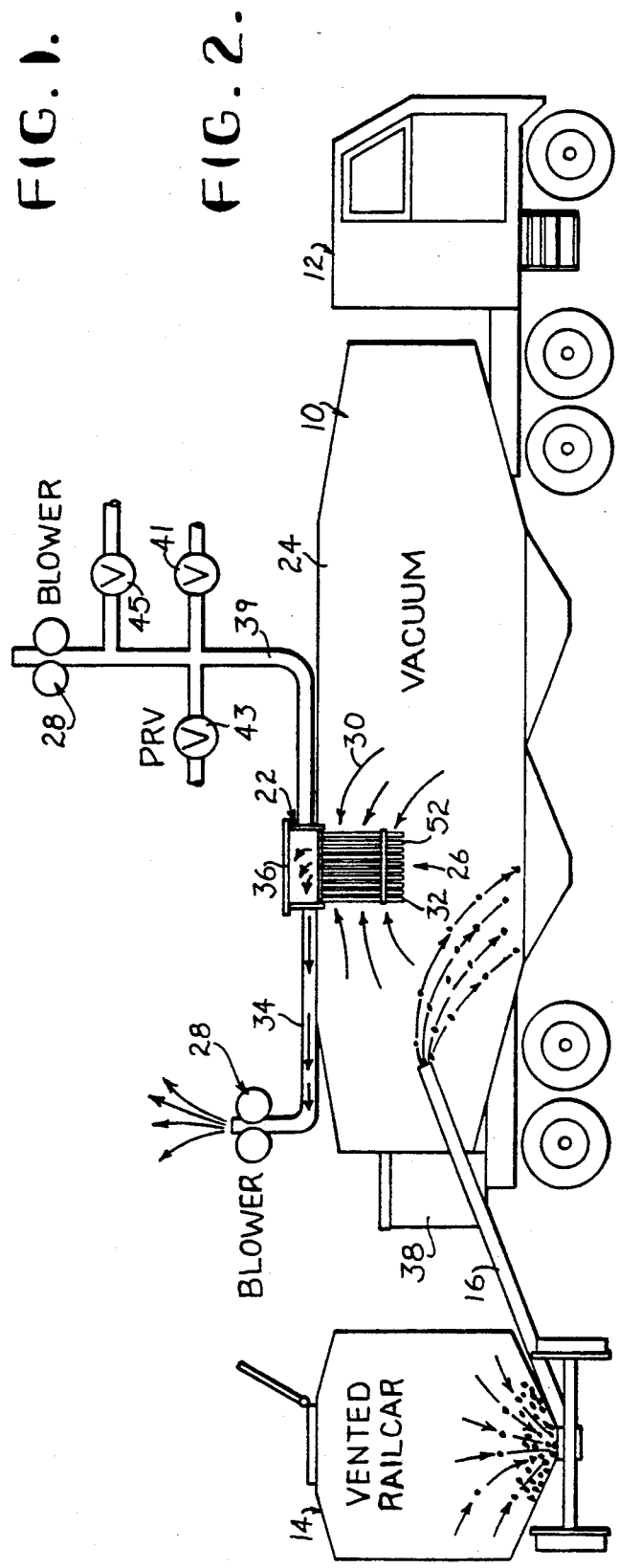

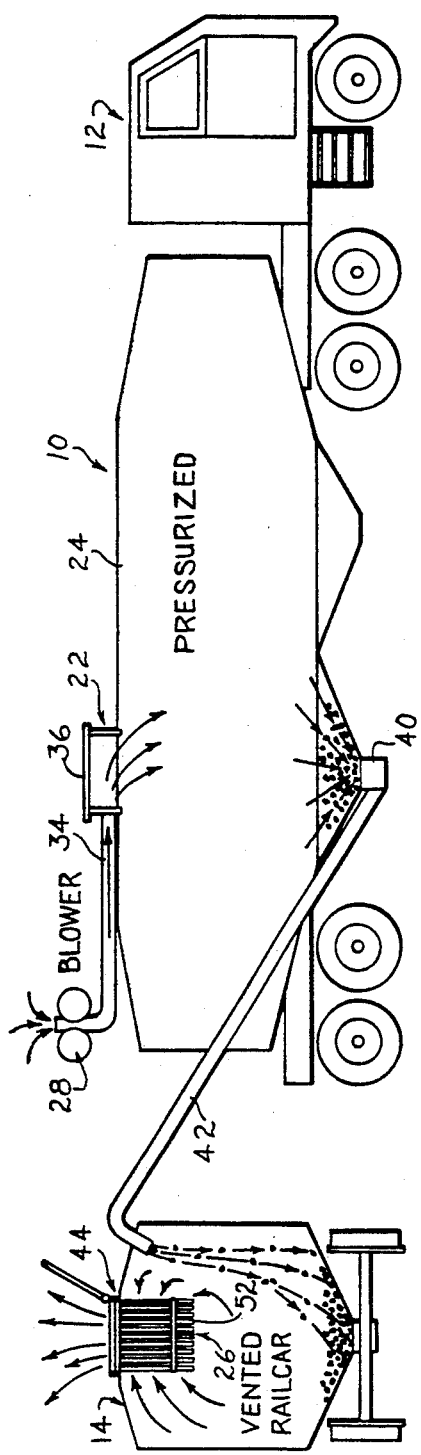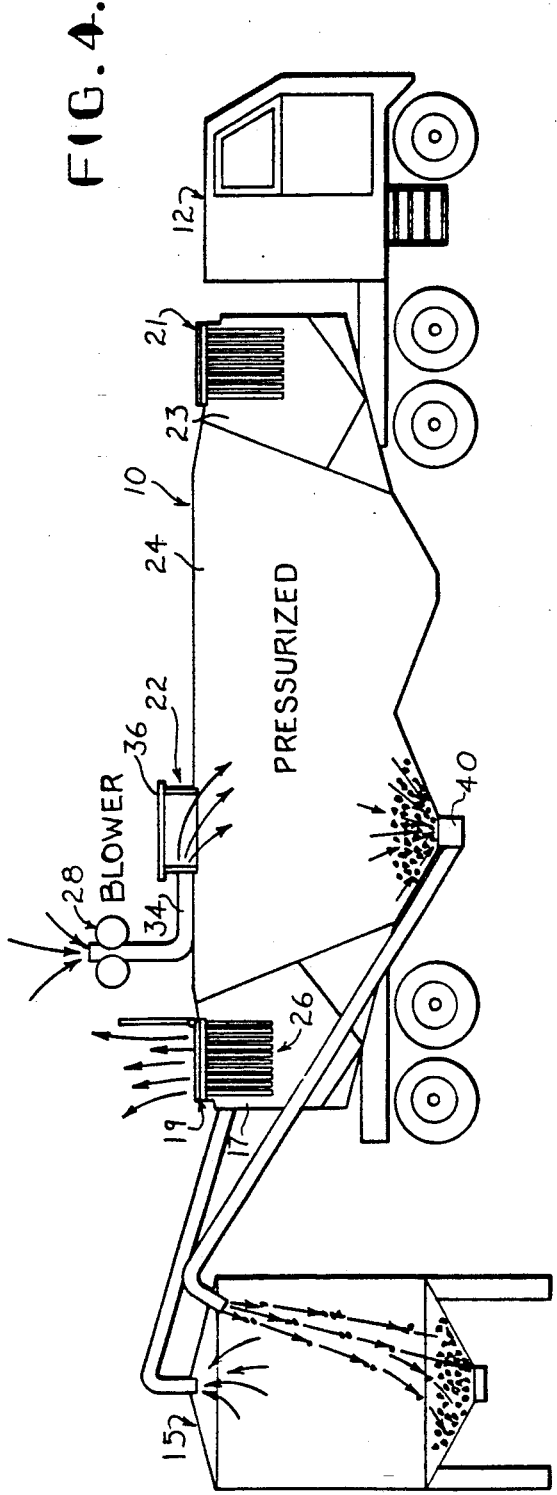

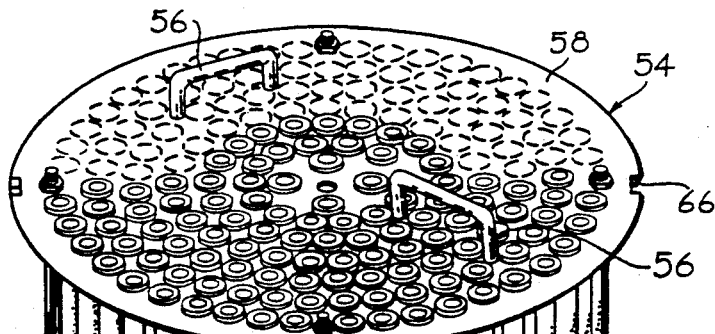
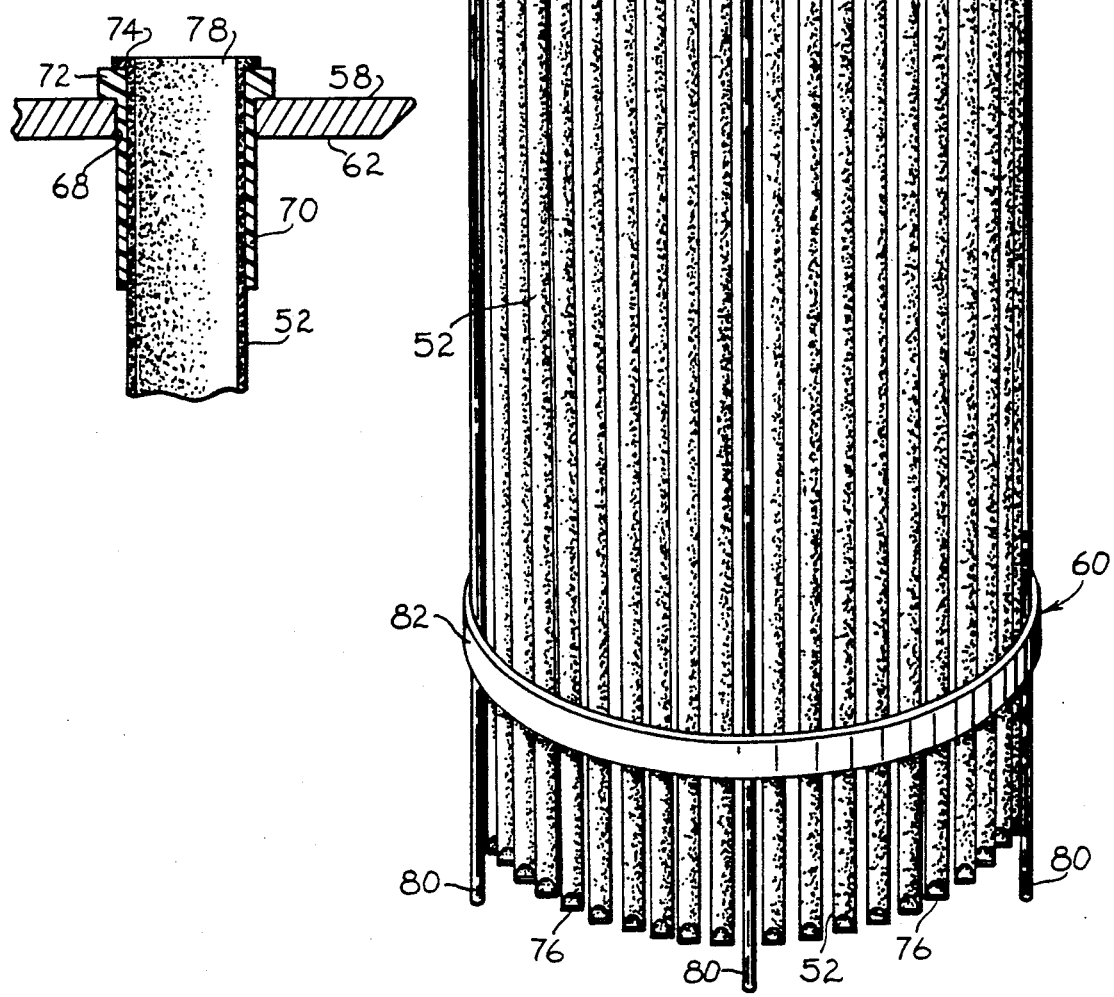

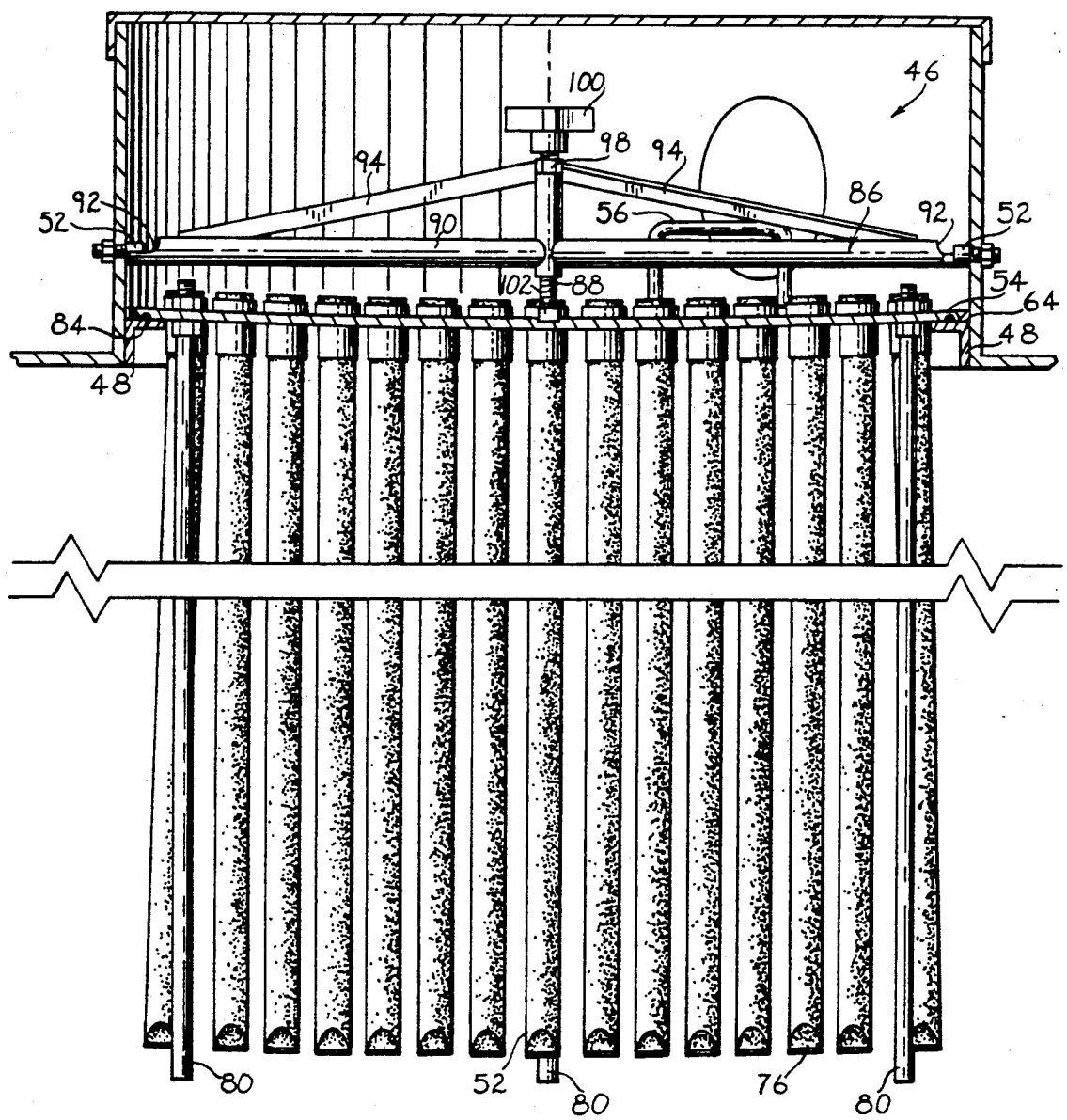
FIG. 7.
FIG. 8.
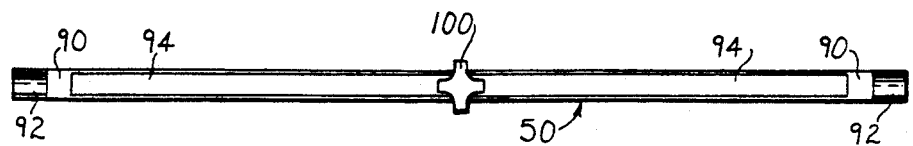

TANK TRUCK MANHOLE FILTER

BACKGROUND OF THE INVENTION

1. Field of the Invention

The present invention relates generally to particulate matter filtration system and, more particularly, to a manhole filter apparatus for use in preventing the escape of dust from hopper containers and railcars during loading and unloading thereof.

2. Discussion of the Prior Art

A known system for transporting particulate matter employs a hopper trailer having a plurality of hopper spaces therein which are connected together internally to define a single storage container. At the lower end of each of the hopper spaces, a discharge chute is provided through which the particulate matter is delivered during unloading of the trailer.

Typically, in addition to the lower discharge chutes, a material inlet is provided on the trailer at or near the top of the trailer along with manholes to permit entry into the storage compartment.

Hopper trailers of this type may be loaded and unloaded in several different ways. For example, in accordance with one loading technique, particulate material is forced into the material inlet of the trailer under positive pressure exerted on the material at the feeding end of the transfer system. As the material enters the storage compartment of the trailer, pressure is relieved through the open manhole to the atmosphere. However, in order to prevent dust and fine particulate matter from escaping from the system into the environment, a filter apparatus is conventionally provided to remove the dust from the air exiting the compartment.

One known filter arrangement used in this type of loading operation includes a bag or sock filter having one open end that may be attached to the manhole in order to ensure that air exiting the manhole passes through the filter. However, there are several drawbacks to using this type of filter apparatus. For example, the sock filter is assembled on the manhole when the manhole is to be vented, and must be removed therefrom whenever the sock is cleaned. In addition, because of the construction of the sock filter, it fills with pressurized air during a loading operation and expands such that the sock extends upward from the manhole into the air above the trailer thus pulling on the sock filter with a force that is sufficient to pull the sock filter from the manhole upon clogging of the filter. When the filter comes loose from the manhole under such conditions, the sock filter and a significant amount of the pressurized dust-filled air blows through the manhole into the environment with significant force.

According to a second loading technique, a blower is connected to the manhole of the hopper trailer in order to create a vacuum within the compartment which draws material into the compartment through the material inlet from a material storage location such as a vented railcar or the like. When a loading operation of this type is carried out, the manhole is typically sealed such that a sock filter may not be employed.

In order to filter the air exiting the compartment upstream of the blower in the second loading method several methods exist. For example it is conventional to employ a cyclone filter which may either be mounted on the rear of the trailer or provided as a separate unit. In conjunction with the cyclone filter, it is known to provide an air filter through which the air passes after exiting the cyclone filter but prior to entering the blower. Of the known filters used in this construction, including paper, plastic tubes or felt materials, all require manual cleaning operations to be carried out periodically. It is also known to use tube filter arrangements as the only filter in environments separate from the environment of the present invention such as in silos and bins.

In review of the known loading arrangements it can be seen that no single filter arrangement is presently known which is versatile enough to find utility in both of the two noted loading methods while providing adequate filtration to protect blower machinery to meet with constantly increasing restrictions on the air quality of air being exhausted from transfer systems of the noted type.

OBJECTS AND SUMMARY OF THE INVENTION

It is an object of the present invention to provide a filter apparatus and transfer system which overcomes the shortcomings of the prior art and which provides a lightweight, interchangeable, inexpensive filter apparatus in which the filter media is placed directly in the tank and which may be used in any type of loading operation and that may be left in the manhole of the trailer even during transportation of the trailer.

In addition, it is an object of the invention to provide a filter apparatus which is self-cleaning and which is disposed in the manhole such that any dust shaken from the filter falls back into the compartment without any need for redirection of the filtered dust particles.

In accordance with the invention, a filter apparatus is provided for use in filtering dust and the like from an air stream flowing through a passage in a particulate transfer system. The apparatus includes a filter assembly made up of a filter sheet having a plan view shape corresponding to the shape of the passage and at least one filter mounted on the filter sheet. Retainer means are provided for supporting the filter sheet in the passage, the retainer means including structure having a perimeter adapted to be secured to the passage and a peripheral bearing surface which engages the filter sheet when the filter assembly is positioned in the passage. In addition, a filter hold down means holds the filter assembly in the passage and presses the filter sheet into contact with the bearing surface of the retainer means. The filter hold down means includes a clamp that centrally contacts the filter sheet.

Preferably, the filter sheet includes a plurality of holes, and a plurality of filters are provided, each being of substantially tubular shape with a first open end and a second closed end, and each being supported in one of the holes with the first open end extending through the hole in the filter sheet such that substantially all of the air flowing through the passage passes first through the filter wall and then through the holes in the filter sheet.

By this construction, numerous advantageous results are realized. For example, by providing a filter apparatus in accordance with the invention, a lightweight, reusable, interchangeable filter assembly is provided which is useful in either a pressure loading or a vacuum loading operation. In addition, the need for heavy supplemental equipment such as a cyclone filter for use in a vacuum loading operation is eliminated. By providing a filter assembly that remains in the manhole during both loading and transportation of the trailer, it is possible for a self-cleaning of the filter to be carried out which does not require any manual redirection of the dust pulled from the filtered air. Cleaning of the filter is automatically carried out by the natural vibration and shaking of the filter which occurs during movement of the trailer during transportation.

A transfer system incorporating the invention includes a storage location having a material passage and a vent passage and a hopper trailer having a material inlet, a material outlet, and a manhole opening. A material conduit extends between and connects the material passage of the storage location and the material inlet of the hopper trailer. Blower means are provided for creating a positive pressure in the system when oriented in a first direction and for creating a negative pressure in the system when oriented in a second direction and a conduit for connecting the blower to the manhole opening. A filter apparatus provided in the manhole of the hopper trailer includes a removable filter assembly and means for retaining the filter assembly in the manhole of the hopper trailer, wherein during a loading operation, vacuum pressure created by operation of the blower means oriented in the second direction causes particulate matter to flow from the storage location to the hopper trailer via the material conduit, and air is drawn from the hopper trailer through the filter apparatus and into the blower means. Thus, the filter apparatus removes dust and fine particulate matter from the air before the air exits the manhole so that the air leaving the hopper trailer is clean relative to the air within the hopper trailer.

BRIEF DESCRIPTION OF THE DRAWING FIGURES

A preferred embodiment of the invention is discussed in detail below with reference to the attached drawing figures, wherein:

FIG. 1 is a schematic view of a loading operation of a hopper trailer, wherein material is delivered to the hopper trailer from a pressurized railcar and the hopper trailer is fitted with a manhole filter apparatus constructed in accordance with a preferred embodiment of the present invention;

FIG. 2 is a schematic view of a loading operation of a self-loading hopper trailer, wherein material is pulled into the hopper trailer from a vented railcar under a negative pressure force generated by a blower connected to the hopper trailer, and the hopper trailer is fitted with a manhole filter apparatus made in accordance with a preferred embodiment of the invention;

FIG. 3 is a schematic view of an unloading operation of a self-loading hopper trailer, wherein material is pushed from the hopper trailer to a railcar by a positive pressure generated by a blower connected to the trailer and the railcar is provided with a manhole filter apparatus constructed in accordance with a preferred embodiment of the present invention;

FIG. 4 is a schematic view of an unloading operation of a hopper trailer, wherein material is pushed from the hopper trailer to a storage container and air from the storage container is directed to a void space in the hopper trailer and passes through a manhole filter constructed in accordance with the invention.

FIG. 5 is a perspective view of a manhole filter assembly constructed in accordance with a preferred embodiment of the invention;

FIG. 6 is a partial sectional view of a filter tube and tube sheet of the preferred embodiment of the inventive filter apparatus;

FIG. 7 is a schematic side elevation view of a filter apparatus constructed in accordance with the preferred embodiment as assembled in the manhole of a hopper trailer or railcar; and FIG. 8 is a top plan view of a hold down assembly of the preferred embodiment.

DETAILED DESCRIPTION OF THE PREFERRED EMBODIMENT

Two different methods of loading a hopper trailer constructed in accordance with the invention are illustrated in the drawing figures. In FIG. 1, a positive pressure loading operation is illustrated and in FIG. 2, a vacuum loading operation is shown.

Looking first to FIG. 1, a hopper trailer 10 is provided which is connected to a towing vehicle such as a tractor 12. During loading of the trailer, the trailer is pulled to a position adjacent a storage location, such as a railcar 14, and a material conduit 16 is connected between a hopper chute 18 of the railcar and a material inlet 20 of the trailer. The manhole 22 of the trailer is opened so that an internal storage compartment 24 of the trailer is vented to the atmosphere, and a filter assembly 26 is positioned in the open manhole.

A blower 28 is connected to the interior of the railcar in an orientation that presents positive pressure to the railcar such that material in the car is forced through the chute 18 and conduit 16 to the compartment 24 of the trailer. As a result of the pressurized delivery of material to the compartment, pressurized, dust-filled air fills the free space in the compartment and attempts to escape the trailer through the manhole as indicated by lines 30.

In order to prevent the polluted air from being exhausted from the trailer the filter assembly 26 is provided which forces the exhausted air to pass first through one of a plurality of filter tubes 32 prior to reaching the environment. The preferred construction of the filter assembly is described more fully below.

According to the mode of loading shown in FIG. 2, a blower 28 is connected to the manhole 22 through an air conduit 34 and is oriented in a direction such that a vacuum is created in the compartment 24. At the feeding end of the system, the railcar or the like 14 is vented in order to permit material therein to be pulled under the force of the vacuum into the compartment 24.

As with the previous loading mode, polluted air attempts to leave the compartment through the manhole 22. However, in this second loading system, the air leaving the manhole is directed to the blower 28 instead of the environment and thus there is a need that the air leaving the compartment be cleaned prior to entering the blower in order to protect the blower from damage. To provide this filtering of the exhausted air, the filter assembly 26 is retained in the manhole 22 and a manhole cover 36 is shut so that clean air passing through the filter is directed to the blower through the conduit 34. If desired, a secondary filter, not shown, may be provided upstream of the blower 28 in order to protect the blower against damage that might occur should polluted air somehow get past the filter assembly 26.

As also shown in FIG. 2, a storage tank 38 may be provided on the trailer in which a filter assembly may be stored during non-use. For example, where a trailer is to be used for two different products, it is possible to dedicate a filter to each product and to store one of the filters on the trailer while the other filter is in use. In this manner, it is not necessary for an operator to clean a single filter at each end of a trip in order to transport different products along each leg of a round trip.

It is noted that during an unloading operation, the hopper trailer 10 is pressurized by a blower 28 which delivers an air stream to the interior compartment 24 of the trailer via the line 39 through the manhole 22. As a result of the pressurization of the compartment 24, material within the compartment is pushed from one of a number of material delivery chutes 40 such as that illustrated in FIG. 3. When this air stream enters the manhole 22, the air travels in a reverse direction through the filters 32 than the direction the air travels during the loading operation such that cleaning of the filters is carried out and the dust collected on the outer surfaces of the filters is blown into the compartment 24 and is carried from the trailer with the material that is being unloaded.

Once unloading is complete, a positive pressure remains in the compartment which must be vented. In order to carry out this venting of the pressure, a valve 41 may be opened which permits air to flow from the compartment, through the filter assembly, the manhole and the line to atmosphere. By providing this path of travel, the air is filtered prior to being released to atmosphere. A pressure relief valve 43 and a valve 45 leading to a material conveying line may also be provided between the manhole and the blower to increase the versatility of the trailer.

An unloading operation is illustrated in FIG. 3, wherein pressure is supplied to the compartment 24 by a blower 28 arranged in communication with the manhole 22 in an orientation which delivers positive pressure to the compartment. Material delivery chutes 40 on the trailer 10 are connected via a material transfer conduit 42 to an upper opening of a storage facility such as a railcar 14. The railcar may include a manhole 44 that is opened to vent the storage area therein to the environment, and a filter assembly 26 constructed in accordance with the preferred embodiment of the invention may be secured within the manhole in order to filter the air being exhausted therefrom.

A further unloading operation is shown in FIG. 4, wherein pressure is again supplied to the compartment 24 within the trailer 10 by blower 28. Material passing through the delivery chutes 40 of the trailer 10 pass via a material transfer conduit 42 to an upper opening of a storage facility 15 such as a bin or the like. Because the material entering the bin 15 is pressurized, air entrained with the material must be exhausted from the bin in order to maintain the bin at a pressure lower than the pressure in the hopper trailer. In order to permit the air to exit the bin 15 without requiring the use of a separate filter assembly to clean the dust-filled air retained in the bin, it is possible to redirect the air from the bin 15 to a normally void space 17 within the trailer 10 having a manhole 19 which is fitted with a filter assembly 26 constructed in accordance with the present invention.

By providing a filter assembly 26 in the manhole 19 of the normally void space 17 of the trailer, it is possible to employ the filter assembly to clean the air from the bin 15 before the air passes on to the environment. In this manner the filter assembly 26 may be used both during a loading operation and during an unloading operation without the need for additional filter assemblies at each of the ends of the material transfer path.

Also shown in FIG. 4, is the use of a separate manhole 21 in another normally void space 23 of the trailer 10 as a storage location at which a filter assembly 26 may be stored when not in use. Such a manhole 21 is conventionally provided on hopper trailers and may be used as a storage location for out-of-use filter assemblies regardless of whether the rear manhole 19 is used in the manner discussed above for filtering air from a storage bin. Further, the rear manhole 19 may also be employed as a storage location for filter assemblies.

Turning to FIG. 7, a filter apparatus 46 constructed in accordance with the preferred embodiment of the invention is shown installed in the manhole 22 of a hopper trailer 10. The apparatus 46 includes a filter assembly 26, a retainer flange 48, a hold down assembly 50, and pair of protruding pins 52 extending radially inward of the manhole of the trailer.

The filter assembly 26 is shown in FIG. 5, and includes a filter sheet 54, a plurality of filter tubes 32 extending downward from the sheet, a pair of handles 56 on an upper surface 58 of the sheet opposite the filter tubes, and a support frame 60 The filter sheet 54 is formed from a thin sheet of flexible material such as aluminum which is capable of bending under high pressures experienced in the hopper trailer so that when such high pressures are experienced, the air vents to atmosphere by forcing the tube sheet to lift from its seated position in the manhole. For example, where the filter assembly is to be used in a manhole having a diameter of about 20 inches, a 19 to 20 inch diameter aluminum filter sheet may be provided having a thickness of ¼ inch.

As shown in FIG. 6, the edge of the filter sheet 54 is angled inward from the upper surface 58 of the sheet toward a bottom surface 62 thereof. This tapered edge is provided to permit the filter sheet to be installed in a manhole of substantially the same diameter as the sheet and rest on the retainer flange 48 even where a weld bead (not shown) extends along an upper surface 64 of the retainer flange 48 around the outer periphery thereof.

Returning to FIG. 5, the pair of handles 56 are shown to be arranged on the filter sheet 54 in such an orientation to permit the maximum number of filter tubes possible to be provided on the assembly. A notch 66 is formed in the filter sheet which permits the sheet to be installed and removed from the manhole in a manner described below.

Anywhere from 150 to over 200 holes 68 are preferably formed in the filter sheet 54 and each of the holes receives one of the filter tubes 32. As shown in FIG. 6, each hole 68 has a diameter somewhat larger than the diameter of one of the filter tubes so that a grommet 70 will fit between the tube 32 and the edge of the hole. Each grommet 70 is preferably formed of a resilient material such as rubber having a hardness of about durometer 40. Each grommet is of generally tubular shape having a flange 72 formed therein adjacent one axial end such that the flange rests against the upper surface 58 of the filter sheet when the remainder of the grommet extends through the filter sheet in the direction toward the bottom of the assembly 26. A flange 74 on each filter tube 32 rests on an upper surface of the grommet 70 to hold the tube 32 in place in the grommet within the hole 68. It is possible to provide a tube filter which fits directly into the holes of the tube sheet without the need for a grommet and such a construction falls within the scope of the present invention.

Each filter tube 32 is of generally tubular shape having a lower closed end 76 and an upper open end 78 which extends through one of the holes in the filter sheet. The filter tubes 32 are preferably formed of a porous plastic material which is chemically inert to those materials typically transported in particulate transfer systems of the type concerned in the present invention. In a preferred construction of the tube filters, each filter is 36 inches long, having a ⅝ inch outer diameter and a thickness of 1/32 inch. The pore size of the filter material is preferably about 50 microns.

Again returning to FIG. 5, the support frame 60 is shown as including four downward extending support legs 80 which are secured to the filter sheet 54 by nuts or any other suitable fastening expedient. The four legs 80 extend beyond the lower ends 76 of the filter tubes 32 so that, when the filter assembly is removed from the manhole and placed on the ground, the legs 80 support the assembly 26 and render the assembly free-standing. In addition, a retention ring 82 is provided which is fastened to the legs 80 and extends around the filter tubes so as to hold the tubes within the frame 60. By retaining the tubes in this manner, it is possible for the assembly 26 to be easily installed in a manhole by a single person without the potential for the tubes catching up on the edge of the manhole and impeding insertion of the assembly or damaging tubes.

When the retention ring is not employed, such as is shown in FIG. 7, the tubes will tend to spread apart from one another when pressure is applied to the central region of the filter sheet. This movement by the tubes is beneficial since it more fully exposes the tubes within the interior compartment 24 of the trailer.

The retainer flange 48 of the filter apparatus 46 is shown in FIG. 7, and includes a single L-shaped angle piece or ring which extends around the interior surface of the manhole. The retainer flange 48 preferably includes a 1×1 inch angle piece of aluminum or similar material which is installed in the manhole and welded in place, e.g., with a weld bead which extends around the periphery of the flange on the upper surface 64 thereof. This upper surface 64 of the retainer flange 48 forms a bearing surface against which the lower surface 62 of the filter sheet 54 rests when installed in the manhole.

In an alternate construction of the invention, where the filter sheet is custom fit to the manhole in which it is to be used, it is possible to replace the L-shaped retainer flange with a flange having a smaller thickness in the radial direction of the manhole such that the filter sheet may be provided with additional filter sheets than are allowed for by the use of the L-shaped flange.

A resilient sealing member 84 is provided between the filter sheet 54 and the retainer flange 48. This sealing member 84 is preferably an O-ring formed of a natural rubber material and having a hardness of about durometer 40. The O-ring 84 extends around the outer perimeter of the filter sheet and bears against both the retainer flange 48 and the filter sheet 54. It is possible to provide a groove in the filter sheet to receive the sealing member such that the sealing member may be secured to the filter sheet by an adhesive or the like to obviate the need for independent handling of the O-ring each time the filter assembly is replaced.

The filter assembly 26 is held in position in the manhole 22 by the hold down assembly which includes an elongated support bar 86 and a centrally disposed clamp member 88. The elongated support bar 86 includes a pair of collinear tubular bar sections 90 each having an end region 92 which is partially cut away to define a lower cup or trough in the bar section. A reinforcing member 94 extends from each of the bar sections toward an upper end of a clamp sleeve 96 that surrounds the clamp member 88. The clamp sleeve extends in a direction substantially perpendicular to the direction in which the bar sections 90 extend and includes an upper threaded portion 98 that engages a threaded portion of the clamp member 88. A hand knob 100 is disposed at the upper end of the clamp member 88 for permitting adjustment of the member, and a toggle shoe 102 is provided at the lower end of the clamp member for engaging the upper surface 58 of the filter sheet 54. A small recess may be provided in the filter sheet at the central axis of the sheet which aligns with the toggle shoe 102 when the sheet 54 is properly installed in the manhole so as to provide a centering of the filter sheet in the manhole.

The protruding pins 52 are provided in the side wall of the manhole and extend radially inward a small distance in order to present a pair of abutments against which the trough or cup regions 92 of the bar sections 90 bear to retain the hold down assembly in place in the manhole. The protruding elements 52 have a diameter substantially equal to the inner diameter of the bar sections 90 in order that the protrusions mate with the upper curved surfaces of the bar sections. As shown in FIG. 8, the hold down assembly 50 is generally no thicker than the outer diameter of the bar sections 90, except at the knob 100, such that very little area within the manhole is consumed by the assembly 50. In addition, due to the large number of filters that are provided in the filter assembly, it is possible for the filter apparatus to be installed in the manhole of a trailer without significantly effecting the maximum flow rate through the manhole.

When it is desired to install the filter assembly 26 into a manhole 22 equipped with a retainer flange 48 and pins 52 of the type shown in FIG. 7, the filter assembly is simply lowered into the manhole at an angle such that the edge of the filter sheet opposite the notch 66 (FIG. 5) may be inserted past one of the pins 52 and into contact with the retainer flange 48. Thereafter, the notch 66 of the filter sheet 54 is lowered over the opposite pin 52 and the sheet is allowed to rest against the flange 48 around the entire periphery of the sheet.

Once in place, the filter sheet 54 is held down by the assembly 50 which is worked into the position shown in FIG. 7, and the knob 100 is turned until the clamp toggle shoe 102 engages the central region the filter sheet 54. As the knob 100 is turned further, the clamp member 88 forces the filter sheet toward the retainer flange such that the sealing member 84 forms an even seal between the two members 54 and 48 around the entire perimeter of the filter sheet. The upward force acting on the hold down assembly at the threaded portion retains the orientation of the assembly relative to the filter assembly and the protruding pins 52 until such time as the clamp is again loosened. In this manner, single point hold down of the filter assembly 26 is achieved such that only one knob needs to be turned in order to fasten or remove the assembly 26 from the manhole 22.

Although in the embodiment shown, a single point hold down assembly is employed, it is possible to use other hold down assemblies which provide a generally central hold down of the filter assembly. For example, two, three, or four point hold down devices may be used which apply pressure to a central region of the filter sheet.

Clamping of the filter sheet 54 by the hold down assembly 50 against the retainer flange 48 may cause the filter sheet to bend somewhat. However, certain advantages are achieved by permitting such bending of the sheet. For example, during loading of the trailer, it is possible that pressure in the compartment 24 will build up to a dangerous level which must be vented to atmosphere in order to prevent a breakdown of the system. In the preferred embodiment, when such pressures build up in the compartment, pressurized air pushes up against the filter sheet 54 and attempts to move the sheet in the area of least resistance. This area is found at the periphery of the sheet due to the one-point hold down provided for by the hold down assembly 50. Thus, the air lifts the edge of the filter sheet off of the flange and, in effect, is burped from the manhole until the pressure build-up is relieved.

Although the filter sheet 54 is illustrated as being substantially flat when not installed, it is possible to provide some built-in curvature to the sheet such that either the upper or lower surface of the sheet is concave. By modifying the shape of the filter sheet in this manner, the pressure level at which the filter sheet tends to burp air when installed in the manhole may be varied. Thus, it is possible to control the pressure level at which relief venting of the system is carried out.

Once installed in the manhole, the filter assembly 26 may remain in place during loading of the trailer regardless of which of the two above-mentioned types of loading operations is employed. This versatility of the preferred filter apparatus results from the ability of the filter apparatus to be retained in the manhole even when the cover is closed over the top of the manhole. Another benefit which results from this feature of the filter apparatus resides in the self-cleaning of the filter tubes which occurs when the filter apparatus is left in the manhole during transportation of the trailer. This self-cleaning is carried out by the natural shaking and vibration which occurs during movement of the trailer, and permits the dust shaken from the filter to be reintroduced to the compartment of the trailer without any outside means being required. Thus, no material loss is experienced since filtered material is returned to the load.

If it is desired to remove and clean the filter assembly 26, e.g., when one filter is to be used with different types of material, then the filter is simply removed from the manhole; cleaned with air, water or solvents dried; and thereafter replaced in the manhole.

Although the invention has been described with reference to the illustrated preferred embodiment, it is noted that substitutions may be made and equivalents employed herein without departing from the scope of the invention as set forth in the appended claims.

What is claimed is:

1. A transfer system for transferring particulate matter under pressure from between a storage location and a hopper trailer, the system comprising:
   a storage location having a material passage and a vent passage;
   a hopper trailer having a material inlet, a material outlet, and a manhole opening;
   a material conduit extending between and connecting the material passage of the storage location and the material inlet of the hopper trailer;
   blower means for creating a positive pressure in the system when oriented in a first direction and for creating a negative pressure in the system when oriented in a second direction;
   conduit means for connecting the blower means to the manhole opening;
   a filter apparatus provided in the manhole of the hopper trailer, the filter apparatus including a removable filter assembly and means for retaining the filter assembly in the manhole of the hopper trailer, wherein during a loading operation, the blower means oriented in the second direction comprises means for creating a vacuum and for causing particulate matter to flow from the storage location to the hopper trailer via the material conduit, and for drawing air from the hopper trailer through the filter apparatus and into the blower means, the filter apparatus comprising means for removing dust and fine particulate matter from the air before the air exits the manhole so that the air leaving the hopper trailer is clean relative to the air within the hopper trailer.

2. The transfer system as recited in claim 1, wherein during an unloading operation where the filter assembly is removed from the manhole, the blower means oriented in the first direction comprises means for creating positive pressure and for causing particulate matter to flow from the material outlet of the hopper trailer.

3. The transfer system as recited in claim 1, wherein the filter assembly includes a filter sheet having a plurality of holes and a cross-sectional shape substantially corresponding to the shape of the manhole, a plurality of filters each of substantially tubular shape with a first open end and a second closed end, and means for supporting each of the filters in one of the holes with the first open end of the filter extending through the hole in the filter sheet such that substantially all of the air flowing through the manhole passes first through the filters and then through the holes in the filter sheet.

4. The transfer system as recited in claim 3, further comprising a seal element between the filter sheet and the manhole of the hopper trailer.

5. The transfer system as recited in claim 3, further comprising means for retaining the filter assembly in the manhole, the retaining means comprising means for applying pressure on the filter sheet and for causing the filters to spread apart from one another within hopper trailer.

6. A transfer system for transferring particulate matter under pressure from between a storage location and a hopper trailer, the system comprising:
   a storage location having a material passage;
   a hopper trailer having a material inlet, a material outlet, and a manhole opening;
   a material conduit extending between and connecting the material passage of the storage location and the material inlet of the hopper trailer;
   first blower means for creating a positive pressure in the storage location; and
   a filter apparatus provided in the manhole of the hopper trailer, the filter apparatus including a filter sheet having a plan view shape corresponding to the shape of the manhole and a plurality of holes passing therethrough, a plurality of filters each being of generally tubular shape with a first open end and a second closed end and means, for supporting each of the filters in one of the holes with the first open end extending through the hole in the filter sheet such that substantially all of the air flowing through the passage passes first through the filters and then through the holes in the filter sheet, wherein during a loading operation, the first blower means for creating positive pressure comprises means for causing particulate matter to flow from the storage location to the hopper trailer via the material conduit, and for venting air from the hopper trailer through the filter apparatus to atmosphere, the filter apparatus comprising means for removing dust and fine particulate matter from the air before the air exits the manhole so that the air leaving the hopper trailer is clean relative to the air within the hopper trailer.

7. The transfer system as recited in claim 6, further comprising means for supporting the filter sheet in the manhole, the supporting means comprising means for applying pressure on the filter sheet to cause the filters to spread apart from one another within the hopper trailer.

8. The transfer system as recited in claim 6, further comprising second blower means for creating a positive pressure in the hopper trailer, wherein during an unloading operation, the second blower means comprises means for creating positive pressure for causing particulate matter to flow from the hopper trailer, and, after all of the material is transferred from the hopper trailer, for venting air from the hopper trailer through the filter apparatus to atmosphere.

9. The transfer system as recited in claim 8, wherein, during the unloading operation, the second blower means comprises means for delivering pressurized air to the hopper trailer through the filter apparatus and for cleaning the filters by the air.

10. A transfer system for transferring particulate matter under pressure from between a storage location and a hopper trailer, the system comprising:
a storage location having a material passage and a vent passage;
a hopper trailer having material inlet, a material outlet, and a manhole opening;
a material conduit extending between and connecting the material passage of the storage location and the material inlet of the hopper trailer;
means for creating a pressure difference in the system between the storage location and the hopper trailer; and
a filter apparatus provided in the manhole of the hopper trailer, the filter apparatus including a removable filter assembly and means for retaining the filter assembly within the manhole of the hopper trailer, wherein during a loading operation, the means for creating a pressure difference between the storage location and the hopper trailer comprises means for causing particulate matter to flow from the storage location to the hopper trailer via the material conduit, and for moving air through the filter apparatus, the filter apparatus comprising means for removing dust and fine particulate matter from the air before the air exits the manhole so that the air leaving the hopper trailer is clean relative to the air within the hopper trailer.

11. The transfer system as recited in claim 10, wherein the filter assembly includes a filter sheet having a plurality of holes and a cross-sectional shape substantially corresponding to the shape of the manhole, a plurality of filters each of substantially tubular shape with a first open end and a second closed end, and means for supporting each of the filters in one of the holes with the first open end of the filter extending through the hole in the filter sheet such that substantially all of the air flowing through the manhole passes first through the filters and then through the holes in the filter sheet.

12. The transfer system as recited in claim 11, further comprising a seal element between the filter sheet and the manhole of the hopper trailer.

13. The transfer system as recited in claim 11, further comprising means for retaining the filter assembly in the manhole, the retaining means comprising means for applying pressure on the filter sheet and for causing the filters to spread apart from one another within the hopper trailer.

14. A transfer system for transferring particulate matter under pressure from between a storage location and a hopper trailer, the system comprising:
a storage location having a material passage and a vent passage;
a hopper trailer having material inlet, a material outlet, and a manhole opening;
a material conduit extending between and connecting the material passage of the storage location and the material inlet of the hopper trailer;
means for creating a pressure difference between the storage location and the hopper trailer; and
a filter apparatus provided in the manhole of the hopper trailer, the filter apparatus including a filter sheet having a plan view shape corresponding to the shape of the manhole and a plurality of holes passing therethrough, a plurality of filters each of generally tubular shape with a first open end and a second closed end, and means for supporting each of the filters in one of the holes with the first open end extending through the hole in the filter sheet such that substantially all of the air flowing through the passage passes first through the filters and then through the holes in the filter sheet, wherein during a loading operation, the means for creating a pressure differential between the storage location and the hopper trailer comprises means for causing particulate matter to flow from the storage location to the hopper trailer via the material conduit, and for passing air from the hopper trailer through the filter apparatus, the filter apparatus comprising means for removing dust and fine particulate matter from the air before the air exits the manhole so that the air leaving the hopper trailer is clean relative to the air within the hopper trailer.

15. The transfer system as recited in claim 14, further comprising means for supporting the filter sheet in the manhole, the supporting means comprising means for applying pressure on the filter sheet and for causing the filters to spread apart from one another within the hopper trailer.

* * * * *